(12) United States Patent
Ho et al.

(10) Patent No.: US 8,031,844 B1
(45) Date of Patent: Oct. 4, 2011

(54) COMMUNICATION SESSIONS FOR A COMMERCIAL TRANSACTION USING TELEPHONE WITH A PRINTER

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 1458 days.

(21) Appl. No.: 11/500,755

(22) Filed: Aug. 7, 2006

(51) Int. Cl.
*H04M 11/00* (2006.01)
(52) U.S. Cl. .................... 379/90.01; 379/93.12
(58) Field of Classification Search .............. 379/90.01, 379/110.01, 93.07, 93.12; 455/556.1, 557
See application file for complete search history.

(56) References Cited

U.S. PATENT DOCUMENTS

| | | | |
|---|---|---|---|
| 2003/0032410 A1* | 2/2003 | Saraswat | 455/414 |
| 2004/0127251 A1* | 7/2004 | Thakkar et al. | 455/552.1 |
| 2005/0231761 A1* | 10/2005 | Pineau | 455/557 |
| 2006/0274724 A1* | 12/2006 | Landschaft et al. | 370/352 |

* cited by examiner

*Primary Examiner* — Stella Woo
(74) *Attorney, Agent, or Firm* — North Shore Patents, P.C.; Michele Liu Baillie

(57) ABSTRACT

A method and system for providing a transaction using a telephone with a printer, includes: establishing a plurality of communications sessions between a first party and a second party to the transaction, where the first party comprises the telephone with the printer; conducting the transaction over a first communication session; and receiving a note by the first party from the second party over a second communication sessions, wherein the note comprises information about the transaction. In one embodiment, the first and second communication sessions exist simultaneously. In one embodiment, the first communication session is a voice session, and the second communication session is a data session. The note is then printed using the telephone with the printer, and a confirmation is sent from the first party to the second party to confirm the printing of the note.

18 Claims, 4 Drawing Sheets

COMMUNICATION SESSIONS FOR A COMMERCIAL TRANSACTION USING TELEPHONE WITH A PRINTER

BACKGROUND

1. Field

This invention relates generally to telecommunications, and more specifically to an apparatus and a method for a telephone with a printer.

2. Related Art

A user uses a telephone for communication, from causal voice conversation to commercial transactions with a merchant, such as ordering a product, purchasing a ticket for a movie, a concert, or a flight, making a payment, securing a hotel or cruise ship reservation, or making an doctor's appointment.

These commercial transactions are conducted over verbal communications without a printed record during the transaction; and are based on assumptions of trust by the user, by the merchant, or by both. When errors occur, it is extremely difficult to retrace the transaction in order to resolve the discrepancy between the customer and the merchant.

In an example, John uses a telephone to order a camera from a consumer electronic company at a 20% discount. During the transaction, he verbally authorizes the company to charge his credit card for the discounted amount. A month later, John finds out from his credit card statement that he has been charged the full price for the camera. Outraged, John calls and complains about the discrepancy, but can provide no proof that the discount is indeed offered during the phone call.

There are commercial transactions that require a printed record in order to redeem a product or service. For example, a commercial transaction involves a movie ticket, a concert ticket, a flight boarding pass, or a hotel reservation record. In many instances, the timely possession of the record is important to the commercial value of the goods.

In an example, Grace and her friend want to do lunch and see a movie after lunch. Grace calls a box office to purchase several tickets for the movie. After completing the purchase, the box office tells Grace that the electronic tickets will be sent as an email to her email account; and she can bring the printed tickets to the cinema. After waiting for one and half hour, Grace receives the email and prints the tickets. By then she and her friend has already missed the lunch hour.

The above discussion illustrates a need for a telephone to print a record for a transaction conducted during a phone call.

SUMMARY

A method and system for providing a transaction using a telephone with a printer, includes: establishing a plurality of communications sessions between a first party and a second party to the transaction, where the first party comprises the telephone with the printer; conducting the transaction over a first communication session; and receiving a note by the first party from the second party over a second communication sessions, wherein the note comprises information about the transaction. In one embodiment, the first and second communication sessions exist simultaneously. In one embodiment, the first communication session is a voice session, and the second communication session is a data session. The note is then printed using the telephone with the printer, and a confirmation is sent from the first party to the second party to confirm the printing of the note.

DETAILED DESCRIPTION

Figure 1:
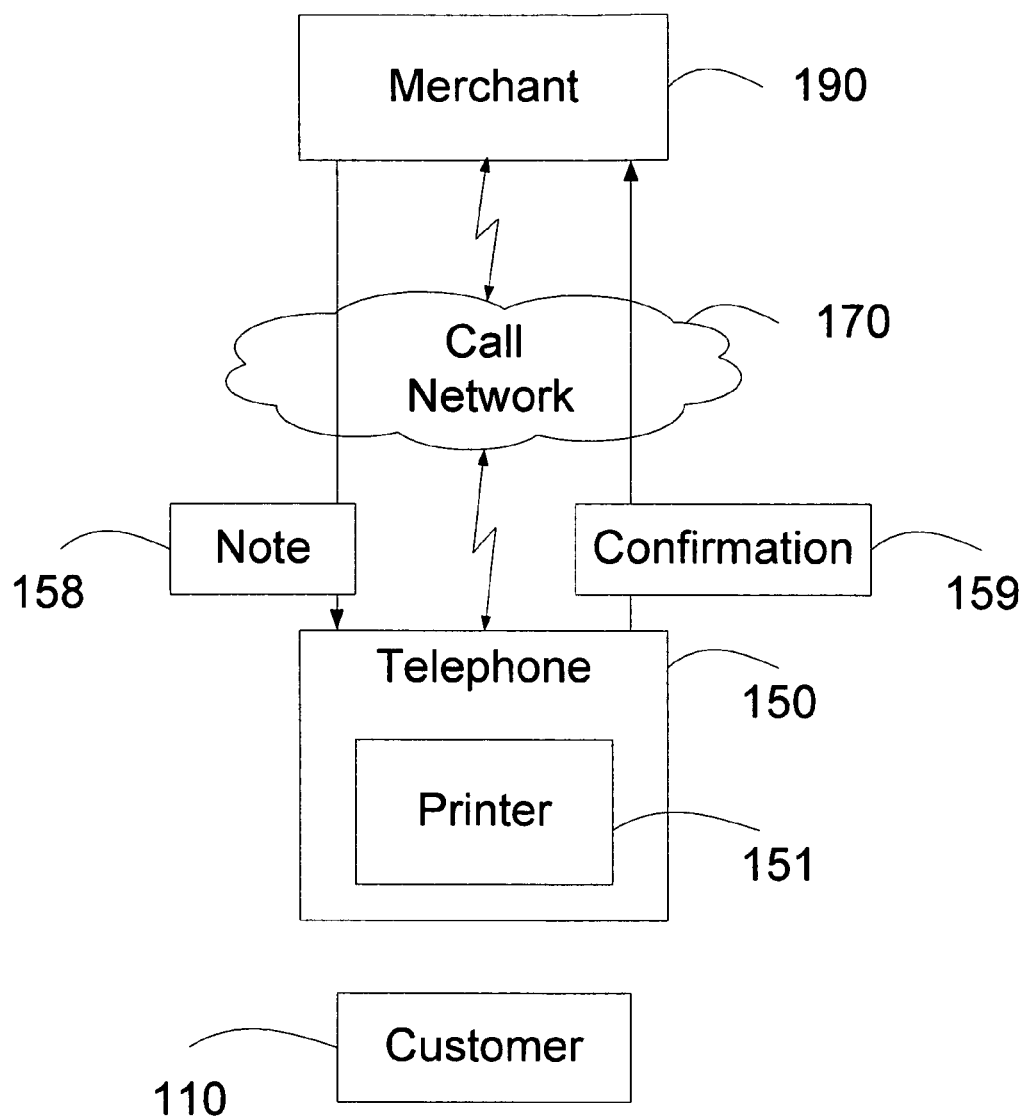
FIG. 1 illustrates a telephone with a printer.

FIG. 1 illustrates a telephone with a printer.

Telephone 150 connects to a call network 170. Call network 170 includes a public voice network, such as the Public Switched Telephone Network (PSTN), a Global System for Mobile Communications (GSM) network, or a public Voice over IP (VoIP) network. In one embodiment, call network 170 includes a private voice network, such as a corporate voice network or a corporate VoIP network. In one embodiment, call network 170 includes a public data network such as the Internet. In one embodiment, call network 170 includes a private data network such as a corporate virtual private network (VPN) or a home network. In one embodiment, call network 170 includes an Instant Messaging based voice network.

Customer 110 uses telephone 150 to conduct a call with a merchant 190 over call network 170. In one embodiment, customer 110 makes the call to merchant 190. In one embodiment, customer 110 receives the call from merchant 190. In one embodiment, merchant 190 includes a person. In one embodiment, merchant 190 includes a customer service representative at a call center. In one embodiment, merchant 190 includes a voice application, such as an Interactive Voice Response (IVR) application.

During the call, customer 110 and merchant 190 communications over a plurality of communication sessions between telephone 150 and merchant 190. In one embodiment, a communication session is a voice communication session. In one embodiment, a communication session is a data communication session.

Customer 110 and merchant 190 conduct a commercial transaction over the plurality of communication sessions.

During the commercial transaction, telephone 151 receives a note 158 from merchant 190 over a communication session. Note 158 records information about the commercial transaction.

Note 158 has a content that fits onto a small size paper. A small size paper is smaller than a normal letter size paper, such as an ISO 216 B6 (125 mm×176 mm) size paper, an ISO 216 A5 (148 mm×210 mm) size paper, an ISO 216 C6 (114 mm×162 mm) size paper, a North American index card (4 inches×6 inches) size paper, a Japan Industrial Standard (JIS) B-6 (128 mm×182 mm) size paper, or a pamphlet size paper.

In one embodiment, the commercial transaction is the purchase of a product or a service, such as a movie ticket, a sport ticket, a concert ticket, a subscription, a camera, or a tennis racket. In one embodiment, the commercial transaction is a stock purchase or sale transaction. In one embodiment, the commercial transaction is a service reservation, such as a hotel reservation, a doctor's appointment, or a cruise ship reservation. In one embodiment, the commercial transaction is a service call, a customer complaint, a medical advice, such as a pre-surgery instruction, or a medication side-effect revelation.

In one embodiment, note 158 is a purchase receipt, a shipment tracking number, a bank transaction receipt. In one embodiment, note 158 is a concert ticket, a movie ticket or a sport event ticket in barcode format, such as 2-dimensional Portable Data File 417 (PDF417) matrix code format. In one embodiment, note 158 is a boarding pass, a hotel reservation number or a dental appointment record. In one embodiment, note 158 is a medical disclosure, a service estimate, a price quote, or a product defect disclosure.

Telephone 150 includes a printer 151. Printer 151 prints note 158 onto a small size paper. In one embodiment, after printing note 158, telephone 150 sends a confirmation 159 to merchant 190, indicating that note 158 has been printed.

In one embodiment, telephone 150 attaches to printer 151 over a universal serial bus (USB) connection, a parallel port connection, or a wireless Bluetooth connection.

Figure 2:
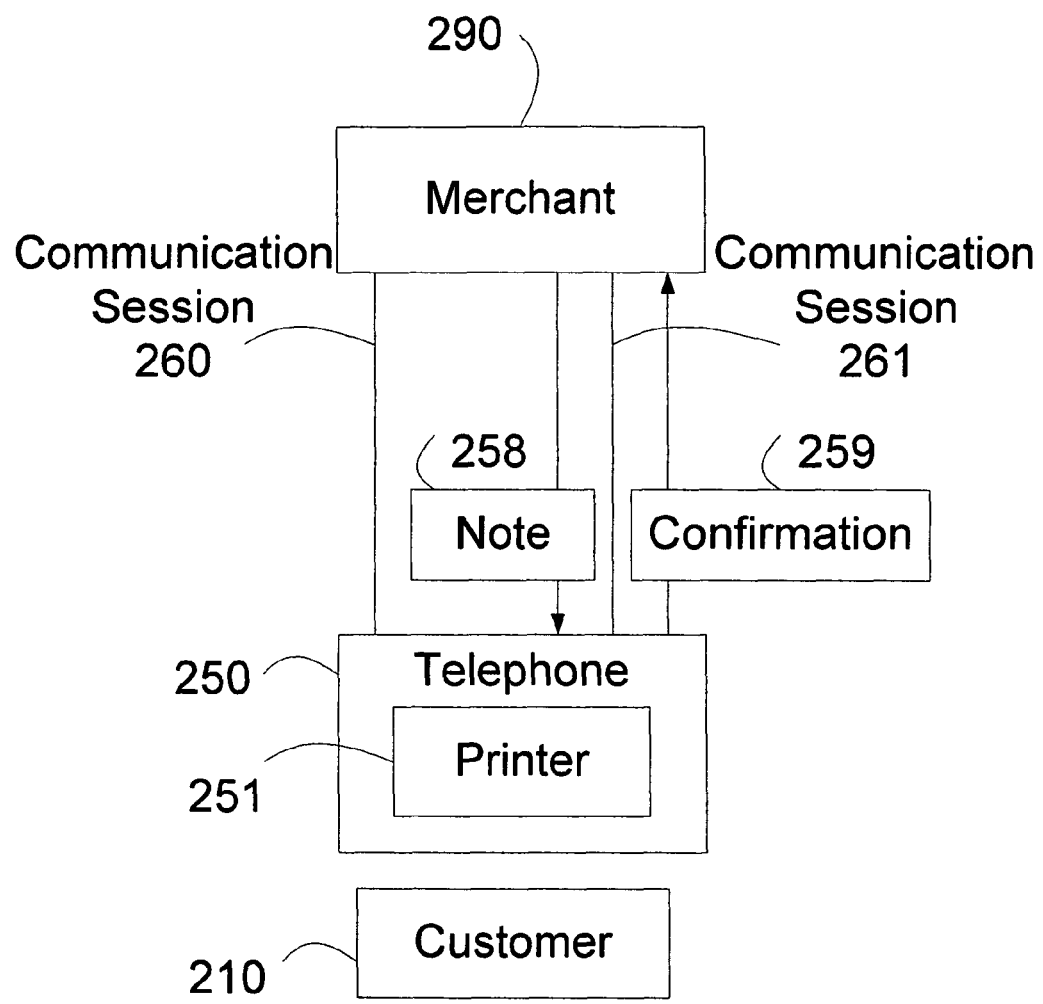
FIG. 2 illustrates a process for telephone to conduct a commercial transaction call.

FIG. 2 illustrates a process for telephone to conduct a commercial transaction call.

A customer 210 is using telephone 250 to conduct a commercial transaction call with a merchant 290. In one embodiment, customer 210 and merchant 290 are conducting the commercial transaction over a first communication session 260. In one embodiment, the first communication session 260 is a voice communication session.

Telephone 250 receives a note 258 from merchant 290 over the call. Note 258 records information about the commercial transaction.

In one embodiment, telephone 250 receives note 258 over a second communication session 261. Communication session 261 is a data communication session.

In one embodiment, communication session 261 uses Web technologies. In one embodiment, merchant 290 includes a Web server and telephone 250 includes a Web client. Telephone 250 receives a notification from merchant 290 for the retrieval of note 258.

In one embodiment, merchant 290 sends the notification to telephone 250 over the first communication session 260. In one embodiment, the first communication session 260 includes a Session Initiation Protocol (SIP) session. Merchant 290 sends the notification to telephone 250 in a SIP INFO message over the first communication session 260. Telephone 250 extracts the notification from the SIP INFO message. SIP INFO message is described in IETF RFC 3261 "SIP: Session Initiation Protocol".

In a different embodiment, merchant 290 sends the notification to telephone 250 using a messaging method over an additional communication session, such as a short message or an instant messaging session. In one embodiment, the short message is delivered via a Short Message Service (SMS). Telephone 250 extracts the notification from the short message.

The notification includes a Web universal resource location (URL) for the retrieval of note 258. Telephone 250 establishes the second communication session 261 with merchant 290 and sends a Hypertext Transfer Protocol (HTTP) request to merchant 290 over the second communication session 261, using the information in the notification. Telephone 250 receives an HTTP response from merchant 290 over the second communication session 261. The HTTP response includes note 258. Telephone 250 extracts note 258 from the HTTP response.

In one embodiment, communication session 261 uses a file transfer technology, such as the File Transfer Protocol (FTP). Telephone 250 includes an FTP client and merchant 290 includes an FTP server. Telephone 250 establishes the second communication session 261 with merchant 290 and sends a RETRIEVE (RETR) command to request for note 258 using the information in the notification. Telephone 250 receives note 258 in a response of the RETR command from merchant 290 over the second communication session 261. FTP is described in IETF RFC 959 "File Transfer Protocol".

In other embodiments, a file transfer session uses Secure Shell File Transfer Protocol (SFTP), Secure Copy Protocol (SCP), or Unix to Unix Copy Protocol (UUCP).

Printer 251 prints the received note 258. In one embodiment, printer 251 prints note 258 after telephone 250 receives note 258 in the entirety. In one embodiment, printer 251 prints a portion of note 258 after telephone 250 receives the portion of note 258.

In one embodiment, after printing note 258, telephone 250 sends a confirmation 259 to merchant 290, indicating that note 258 has been printed. In one embodiment, telephone 250 digitally signs confirmation 259 before sending confirmation 259. In one embodiment, telephone 250 prompts customer 210 before sending confirmation 259. In one embodiment, telephone 250 sends confirmation 259 in an HTTP POST request to merchant 290. In one embodiment, the HTTP POST request includes a digital signature.

In one embodiment, while telephone 250 is receiving note 258 over the second communication session 261, customer 210 continues to communicate with merchant 290 over the first communication session 260.

In one embodiment, after printer 251 prints note 258, customer 210 and merchant 290 continue to communicate over the first communication session 260.

Figure 3:
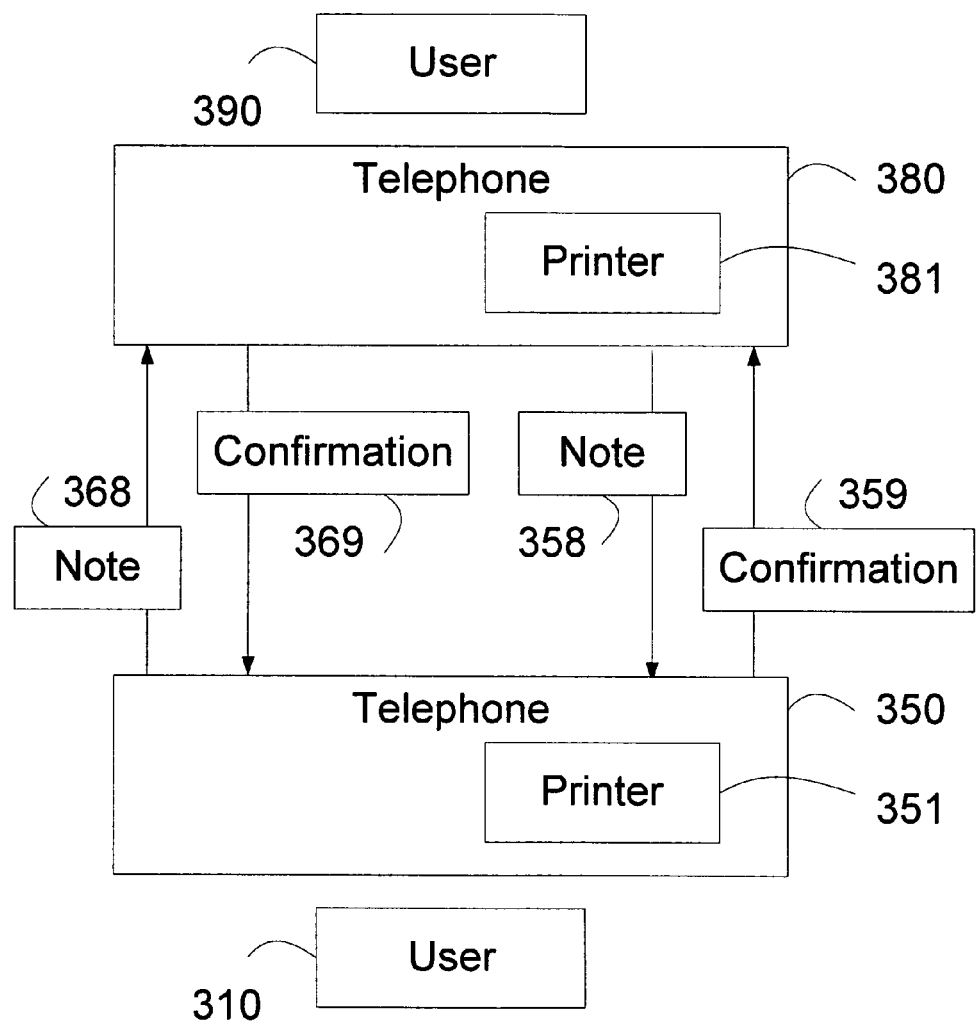
FIG. 3 illustrates a process for telephone to conduct a business-to-business transaction call.

FIG. 3 illustrates a process for telephone to conduct a business-to-business transaction call.

A first user 310 is using first telephone 350 to conduct a business-to-business transaction call with a second user 390 using telephone 380. Telephone 380 includes printer 381. First user 310 and first telephone 350 play the role of a first merchant. Second user 390 and second telephone 380 play the role of a second merchant. First user 310 and second user 390 are conducting a business-to-business transaction during the call.

In one embodiment, first user 310 plays the role of a customer as illustrated in FIG. 2. Telephone 350 receives a note 358 from telephone 380 and printer 351 prints the received note 358. In one embodiment, telephone 350 receives note 358 from telephone 380 using Web technologies such as HTTP or FTP as illustrated in FIG. 2. Note 358 records information about the business-to-business transaction. In one embodiment, telephone 350 sends a confirmation 359 to telephone 380, indicating that note 358 has been printed.

In one embodiment, the second user 390 plays the role of a customer as illustrated in FIG. 2. Telephone 350 sends a note 368 to telephone 380. In one embodiment, telephone 350 sends note 368 to telephone 380 using Web technology such as HTTP or FTP as illustrated in FIG. 2. Note 368 records information about the business-to-business transaction. In one embodiment, telephone 350 receives a confirmation 369 from telephone 380, indicating that note 368 has been printed.

Figure 4:
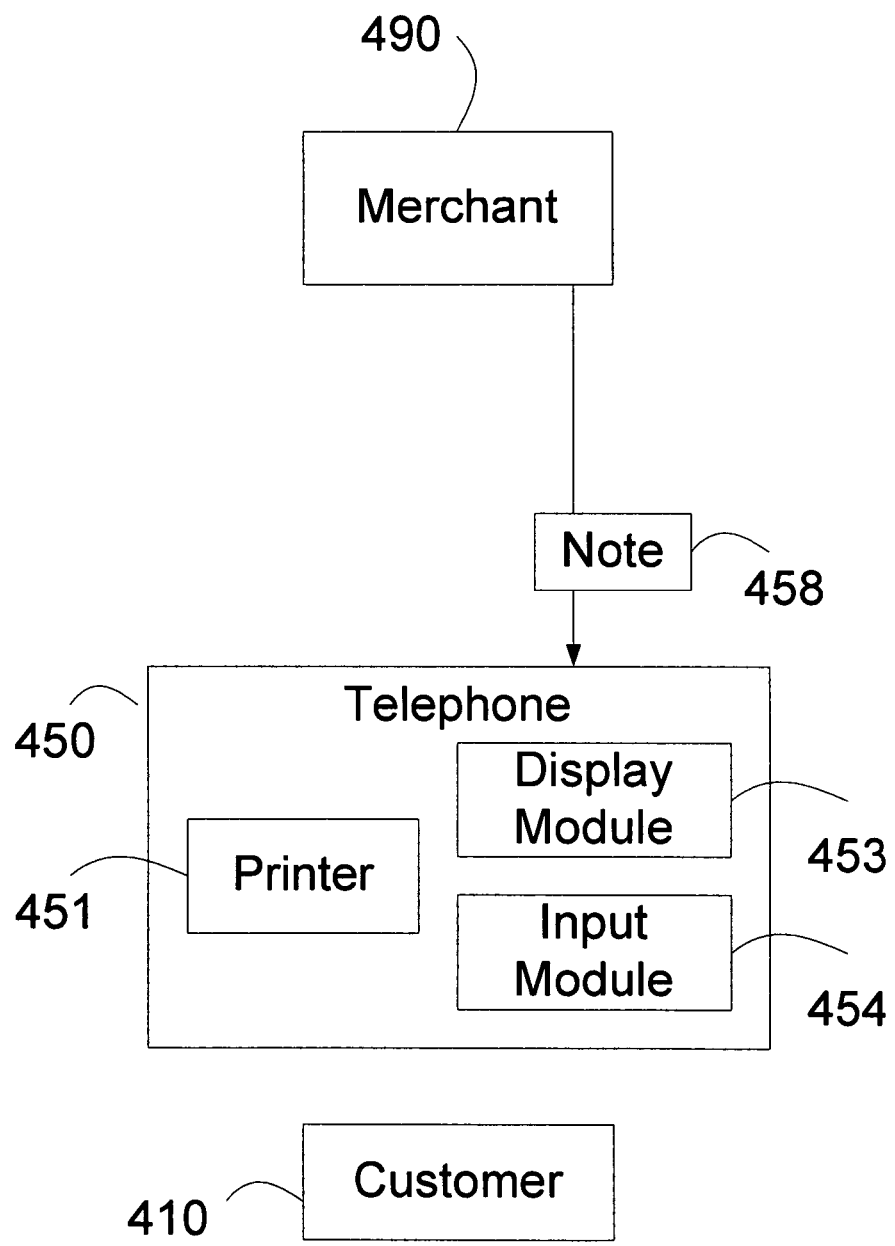
FIG. 4 illustrates a process for telephone to display a received note prior to printing during a commercial transaction call.

FIG. 4 illustrates a process for telephone to display a received note prior to printing during a commercial transaction call.

Customer 410 is using telephone 450 to conduct a commercial transaction call with merchant 490.

During the commercial transaction, telephone 450 receives a note 458 from merchant 490.

In one embodiment, telephone 450 includes a display module 453. In one embodiment, display module 453 includes a graphical display screen. In one embodiment, the dimension of the graphical display screen is 6 inches horizontal by 4 inches vertical. In one embodiment, the dimension of the graphical display screen is 125 mm horizontal by 88 mm vertical. In one embodiment, the graphical display screen has a diagonal dimension of 2 inches.

Telephone 450 displays note 458 on display module 453. In one embodiment, telephone 450 displays note 458 after telephone 450 receives note 458 in the entirety. In one embodiment, telephone 450 displays a portion of note 458 after telephone 450 receives the portion. In one embodiment, telephone 450 displays a textual or graphical representation of note 458.

In one embodiment, telephone 450 includes an input module 454. In one embodiment, input module 454 includes a stylus, a pointing device, or navigation keys. Customer 410 uses input module 454 to initiate printing note 458, such as pressing a navigation key. Printer 451 prints note 458.

In one embodiment, customer 410 uses input module 454 to select a portion of note 458 for printing. Printer 451 prints the selected portion of note 458. In on embodiment, printer 451 prints the portion of note 458 that is displayed on display module 453.

In one embodiment, a commercial transaction is a business transaction within a corporation. In one embodiment, the business transaction is an inter-departmental transaction. In one embodiment, the business transaction is an internal business service transaction such as human resource service, information technology (IT) service, payroll service, benefit enrollment service, travel arrangement service, or facility request service.

In one embodiment, telephone connects to printer over a data network. In one embodiment, the data network is a home data network. In one embodiment, the data network is a corporate data network. In one embodiment, the data network includes a wired network, such as an Ethernet network. In one embodiment, the data network includes a wireless network, such as a WiFi network.

In one embodiment, a note includes additional business information, such as a business telephone number, a business address, opening-hours for a business, a business card, a map, a driving direction, a restaurant menu, a product description or picture, a charity pledge, or a discount coupon.

We claim:

1. A method for a transaction using a telephone with a printer, comprising:
   (a) establishing a plurality of communication sessions between a telephone of a first party and a call center of a second party, wherein the telephone comprises the printer;
   (b) establishing a Session Initiation Protocol (SIP) voice communication session of the plurality of communication sessions between the telephone and the call center;
   (c) conducting a transaction between the telephone and the call center over the SIP voice communication session;
   (d) receiving a notification by the telephone in a SIP INFO message over the SIP voice communication session;
   (e) extracting the notification from the SIP INFO message by the telephone;
   (f) establishing a data communication session of the plurality of communication sessions between the telephone and the call center using information in the extracted notification, wherein the voice SIP and the data communication sessions exist simultaneously; and
   (g) receiving a note by the telephone from the call center over the data communication session while simultaneously the telephone and the call center continues to communicate over the SIP voice communication session, wherein the note comprises information about the transaction.

2. The method of claim 1, further comprising:
   (h) printing the note using the telephone comprising the printer.

3. The method of claim 2, further comprising:
   (i) sending a confirmation from the telephone to the call center to confirm the printing of the note.

4. The method of claim 2, wherein the telephone attaches to the printer over a universal serial bus, wherein the printing (h) comprises:
   (h1) sending the note from the telephone to the printer over the universal serial bus; and
   (h2) printing the note using the printer.

5. The method of claim 2, wherein the printing (h) comprises:
   (h1) printing the note using the telephone comprising the printer, while the telephone and the call center simultaneously continues to communicate over the SIP voice communication session.

6. The method of claim 5, wherein the printing (h) further comprises:
   (h2) continuing to communicate over the SIP voice communication session by the telephone and the call center after the printer prints the note.

7. The method of claim 1, wherein the establishing (f) and the receiving (g) comprises:
   (f1) receiving a notification by the telephone from the call center over the SIP voice communication session;
   (f2) establishing the data communication session between the telephone and the call center using information in the extracted notification; and
   (g1) extracting the note received from the call center over the data communication session by the telephone while simultaneously the telephone and the call center continues to communicate over the SIP voice communication session.

8. The method of claim 1, wherein the call center comprises a telephone of the second party, wherein the SIP voice communication session and the data communication session are established between the telephone of the first party and the telephone of the second party.

9. The method of claim 1, wherein the SIP voice communication session and the data communication session are established over a data network, wherein the data network comprises a public Voice over IP network or an Instant Messaging based voice network.

10. A system, comprising:
    a telephone comprising a printer; and
    a call center, wherein a plurality of communication sessions are established between the telephone and the call center,
    wherein a Session Initiation Protocol (SIP) voice communication session of the plurality of communication sessions is established between the telephone and the call center, and a transaction between the telephone and the call center is conducted over the SIP voice communication session,
    wherein a notification in a SIP INFO message is received by the telephone over the SIP voice communication session,
    wherein the notification is extracted from the SIP INFO message by the telephone,
    wherein a data communication session of the plurality of communication sessions is established between the telephone and the call center using information in the extracted notification,
    wherein the voice and the data communication sessions exist simultaneously, and wherein a note from the call center is received by the telephone over the data communication session while simultaneously the telephone and the call center continues to communicate over the SIP voice communication session, wherein the note comprises information about the transaction.

11. The system of claim 10, wherein the telephone prints the note using the printer.

12. The system of claim 11, wherein the telephone sends a confirmation to the call center to confirm the printing of the note.

13. The system of claim 11, wherein the telephone attaches to the printer over a universal serial bus, wherein the note is sent from the telephone to the printer over the universal serial bus and the printer prints the note.

14. The system of claim 11, wherein the telephone comprising the printer prints the note while simultaneously the telephone and the call center continues to communicate over the SIP voice communication session.

15. The system of claim 14, wherein the telephone and the call center simultaneously continues to communicate over the SIP voice communication session after the printer prints the note.

16. The system of claim 10, wherein the telephone receives a notification from the call center over the SIP voice communication session, wherein the data communication session is established using information in the extracted notification, and wherein the telephone extracts the note over the data communication session while simultaneously the telephone and the call center continues to communicate over the SIP voice communication session.

17. The system of claim 10, wherein the call center comprises a telephone of the second party, wherein the SIP voice communication session and the data communication session are established between the telephone of the first party and the telephone of the second party.

18. The system of claim 10, wherein the SIP voice communication session and the data communication session are established over a data network, wherein the data network comprises a public Voice over IP network or an Instant Messaging based voice network.

* * * * *